United States Patent [19]

Nijhuis

[11] 4,406,036

[45] Sep. 27, 1983

[54] APPARATUS FOR CONVEYING ANIMALS TO BE STUNNED

[75] Inventor: Johan W. Nijhuis, Winterswijk, Netherlands

[73] Assignee: Machinefabriek G. J. Nijhuis B.V., Netherlands

[21] Appl. No.: 383,284

[22] Filed: May 28, 1982

Related U.S. Application Data

[63] Continuation-in-part of Ser. No. 148,033, May 8, 1980, abandoned, and Ser. No. 299,541, Sep. 4, 1981, which is a continuation-in-part of Ser. No. 202,322, Oct. 30, 1980, abandoned, which is a continuation of Ser. No. 905,371, May 12, 1978, abandoned.

[51] Int. Cl.³ .......................... A22B 1/00; A22B 3/06
[52] U.S. Cl. ...................................... 17/1 A; 17/1 E; 198/853
[58] Field of Search .......................... 17/1 A, 1 E, 24; 198/853, 850

[56] References Cited

U.S. PATENT DOCUMENTS

| 2,624,444 | 1/1953 | Casabona . |
| 2,812,051 | 11/1957 | Duckro et al. . |
| 2,911,091 | 11/1959 | Imse . |
| 3,034,638 | 5/1962 | Franz . |
| 3,245,517 | 4/1966 | Ward . |
| 3,377,649 | 4/1968 | Rains . |
| 3,759,369 | 9/1973 | Vering et al. . |
| 4,069,911 | 1/1978 | Ray . |

FOREIGN PATENT DOCUMENTS

| 327372 | 10/1920 | Fed. Rep. of Germany . |
| 345352 | 12/1921 | Fed. Rep. of Germany . |
| 1044707 | 11/1958 | Fed. Rep. of Germany . |
| 2090671 | 1/1972 | France . |
| 7113155 | 3/1973 | Netherlands . |
| 1227371 | 7/1971 | United Kingdom . |

Primary Examiner—Willie G. Abercrombie
Attorney, Agent, or Firm—Arnold, White & Durkee

[57] ABSTRACT

An apparatus is provided for conveying animals to be stunned. The apparatus comprises two sets of endless conveyor belts. Each set of belts defines a substantially V-shaped passageway. Animals are wedged between the V-shaped belts and conveyed into contact with stunning electrodes. The conveyor belts include a plurality of curved plates hinged together at their edges to form a gap free and uninterrupted operating surface to contact the animals's skin. The trailing edge of each plate partly surrounds the leading edge of the following plate. The outer surface of each plate is curved so that the surface is generally concentric with the axis of the reversing wheel. The gap between the first set of conveyor belts and the second set of conveyor belts is bridged by guide rollers positioned tangentially to the operating surface of the conveyor belts.

8 Claims, 3 Drawing Figures

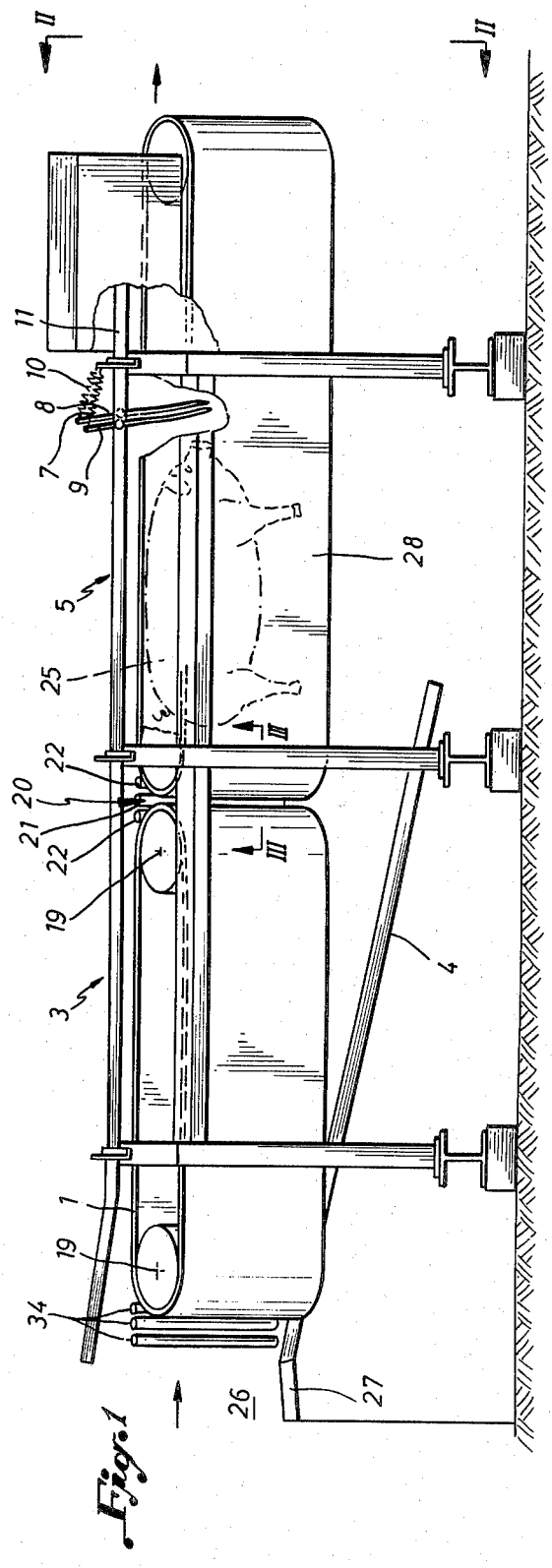
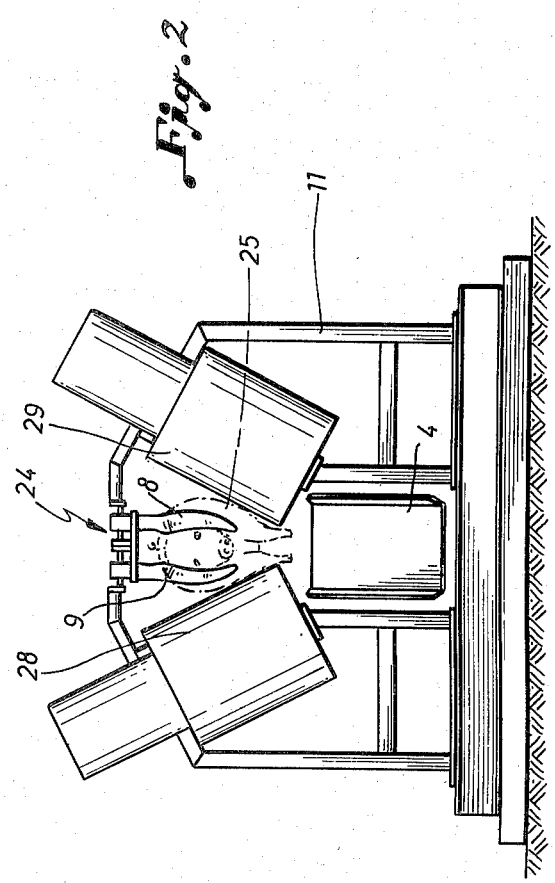

APPARATUS FOR CONVEYING ANIMALS TO BE STUNNED

CROSS REFERENCE TO RELATED APPLICATIONS

This application is a continuation in part of application, Ser. No. 148,033, filed May 8, 1980, now abandoned, and application, Ser. No. 299,541, filed Sept. 4, 1981, which is a continuation in part of application, Ser. No. 202,322, filed Oct. 30, 1980, now abandoned, which is a continuation of application, Ser. No. 905,371, filed May 12, 1978, now abandoned. This application discloses subject matter related to co-pending application, Ser. No. 147,826, filed May 8, 1980; co-pending application, Ser. No. 147,827, filed May 8, 1980, now U.S. Pat. No. 4,338,700; co-pending application, Ser. No. 148,034, filed May 8, 1980, now U.S. Pat. No. 4,319,383; and co-pending application, Ser. No. 161,298, filed June 20, 1980, now U.S. Pat. No. 4,353,147. The disclosures of each of the foregoing applications are hereby incorporated by reference.

BACKGROUND OF THE INVENTION

In applicant's co-pending application, Ser. No. 202,322, applicant disclosed an apparatus for automatically stunning animals to be slaughtered. In the preferred embodiment of the illustrated apparatus, two V-shaped restrainers are used for transporting the animals into contact with stunning electrodes. The animals are first held in a slow moving V-shaped restrainer. The animals are then transferred to a faster moving V-shaped restrainer which moves the animals into contact with stunning electrodes. The faster moving second restrainer insures that the animals will not be touching each other when they are brought into contact with the stunning electrodes.

The transportation of animals in a V-shaped restrainer presents problems that are not involved in the transportation of objects such as bundles of newspapers, cans, jars, boxes, etc., on a flat conveyor belt. Animals that are supported in a V-shaped restrainer are wedged between the opposite operating surfaces of the V-shaped restrainer or conveyor means so that the animal's skin is pressed against the conveyor plates of the restrainer. An animal's hair and hide can become caught in the gaps between adjacent links of the conveyor. As the conveyor plates move around the reversing wheel, the gaps between the plates first open, and then close. That is, the abutting edges of the plates move apart when the plates move out of the plane of the operation surface and begin to move around the reversing wheel. The abutting edges then move together again when the plates return around the reversing wheel to the plane of the operating surface. The skin of the animal can be pinched and damaged by the closing gaps.

In addition, an animal's hide, hair and legs can become caught in the gap between the oppositely moving belts where a first restrainer meets a second restrainer. For example, at the transition area where the exit of the first restrainer meets the entrance of the second restrainer, the opening gap between adjacent plates of the first restrainer's conveyor belts may grip the leg of an animal and move it into the gap between the adjacent reversing wheels of the first restrainer and the second restrainer. The animal's leg may then be caught by the closing gap between adjacent plates of the second restrainer's conveyor belts which are moving in the opposite direction. The gap between the adjacent plates can close with enough excruciating force to break the animal's leg or severely damage it.

When an animal's hide or hair is caught in the gaps between adjacent links of a conveyor belt, the animal can be agitated as the gaps close and the skin of the animal is pinched and damaged. It is believed that this pinching action may inflict excruciating pain on the animal. The animals often sense that something is about to happen and will squirm to try to escape from the V-shaped restrainer. The animal's actions may cause it to be wedged into the V-shaped restrainer even tighter. This increases the likelihood that the animal's skin will be pinched or the animal's leg will be caught, thereby increasing the animal's agitation.

In the environment of a stunning apparatus, this agitation is undesirable. Applicant has recognized that the agitation of the animal tends to raise the pH value of the meat which will lower the quality of the meat that is produced when the animal is slaughtered. Conventional conveyor systems fail to recognize this problem.

SUMMARY OF A PREFERRED EMBODIMENT OF THE INVENTION

Recognizing the need for an improved conveyor system for transporting animals to be stunned, the present invention is intended to provide a novel conveyor system which minimizes or reduces the problem of the agitation of animals being carried in a V-shaped restrainer. The present invention also solves other problems, which will become apparent from a reading of the specification as a whole.

The present invention provides a novel conveyor system for conveying animals having two restrainers, the first positioned in front of and in line with the second. The links of the conveyor belts are provided with plates having a curved outer operating surface for bearing against an animal. The outer operating surface is curved outwardly so that the arc formed by the operating surface as the plate moves around a reversing wheel is generally concentric with the axis of the reversing wheel.

The present invention includes as a further feature a circular front edge on each plate, where the front edge is generally concentric with the front hinge shaft. Each plate has a rear edge with a concave surface forming an arc that is generally concentric with the rear hinge shaft. The circular front edge and concave rear edge correspond generally with each other to minimize the tendency of an animal's hide and hair to be caught between the adjacent plates.

The present invention includes as a further feature, a plurality of guide rollers located between the first restrainer and the second restrainer to provide a continuous transition between the restrainers and to inhibit the tendency of an animal's leg, hair and hide from being caught between the restrainers. The guide rollers are located with their axes generally parallel to the operating surfaces of the plates, and the guide rollers are located so that the outer surfaces of the guide rollers are tangential to a plane coincident with the operating surfaces of the plates.

Additional features of the invention will become apparent from a review of the following detailed description of a preferred embodiment.

BRIEF DESCRIPTION OF THE DRAWINGS

FIG. 1 is a side view of two restrainers illustrating guide rollers positioned at the gap between the two restrainers.

FIG. 2 is a front view of the restrainers illustrated in FIG. 1.

DETAILED DESCRIPTION OF A PREFERRED EMBODIMENT

Figure 3:
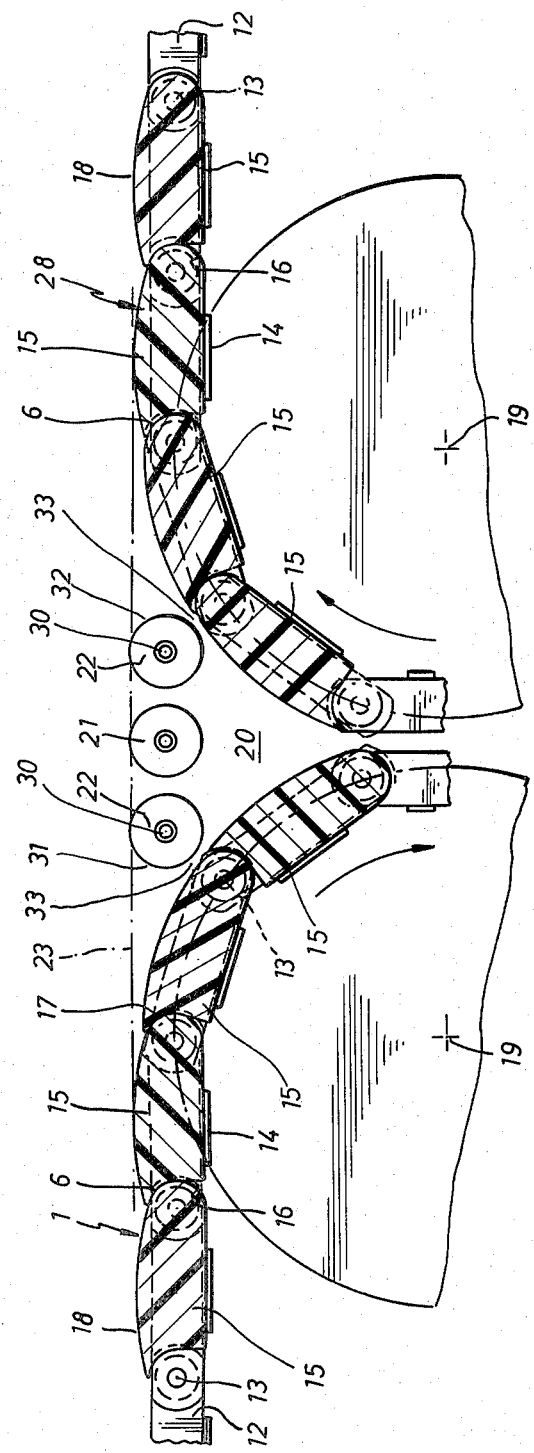
FIG. 3 is a diagrammatic cross-section taken along line III—III in FIG. 1 showing a cutaway view of the intersection of the conveyor belts of two restrainers.

FIG. 1 illustrates a stunning apparatus having a first restrainer 3 and a second restrainer 5. The restrainers 3 and 5 are adapted to hold an animal 25 and to restrain the animal's movement while moving the animal 25 into contact with electrodes 7 and 8. The second restrainer 5 is positioned in line with and immediately following the first restrainer 3. The first restrainer 3 has two endless conveyor belts or conveyor means 1 and 2 which are positioned generally parallel to each other to form a passageway 24 that is substantially V-shaped with respect to a plane perpendicular to the plane 23 of the operating surfaces 18 of the right conveyor belt 1 and the left conveyor belt 2. This can best be seen by referring to the front view shown in FIG. 2.

The right and left conveyor belts 1 and 2 are placed a distance from each other so that the opposite operating surfaces 18 can support the body of an animal 25. Referring to FIG. 1, the animals 25 enter from an admission channel 26 in the direction of the arrow. The animals' feet are supported by a platform 27. As the animals 25 move from left to right in FIG. 1, a downwardly sloping ramp 4 forming the bottom of the V-shaped passageway 24 gradually drops from beneath the animals' feet and the animal 25 is lowered until the animal 25 becomes wedged between the right and left conveyor belts 1 and 2.

The conveyor belts 1 and 2 are driven sychronously such that the opposite faces 18 of the belts 1 and 2 move in the same direction at the same speed.

In a stunning apparatus, it is desirable to provide two V-shaped restrainers 3 and 5, with the second restrainer 5 being driven at a faster speed than the first restrainer 3. If succeeding animals 25 are touching each other, when the first animal 25 contacts the electrodes 7 and 8 the second animal 25 may receive a harmful and painful electric shock. In the disclosed apparatus, the separation of the animals 25 from each other is achieved by providing the two succeeding restrainers 3 and 5. Referring to FIG. 1, the first restrainer 3 moves at a lower rate of speed than the second restrainer 5. Thus, if the animals 25 are touching each other as they are moved down the first restrainer 3, the animals 25 will be separated as they each pass to the faster moving second restrainer 5.

The second restrainer 5 is constructed similarly to the first restrainer 3. The second restrainer 5 includes two endless conveyor belts or conveyor means 28 and 29. The operating surface 18 of the right conveyor belt 28 of the second restrainer 5 is in the same plane 23 as the operating surface 18 of the right conveyor belt 1 of the first restrainer 3. Similarly, the operating surface of the left conveyor belt 29 of the second restrainer 5 is in the same plane as the operating surface of the left conveyor belt 29 of the second restrainer 5. The second restrainer 5 includes stunning electrodes 7 and 8 for electrically stunning the animal 25. The two restrainers 3 and 5 may be held in position by support means 11, which may take the form of a frame 11.

One problem experienced with the utilization of succeeding restrainers 3 and 5 occurred as the animals 25 moved across the gap 20 between the two restrainers 3 and 5. An animal's leg can become trapped in the space or gap 20 between the first restrainer 3 and the second restrainer 5. At this point, the restrainer 3 and 5 are moving in opposite directions. Entrapment of an animal's legs in the gap 20 between the first and second restrainers 3 and 5 can result in painful injury to the animal 25.

In accordance with the present invention, guide rollers 21 and 22 are provided at the gap 20 between the first restrainer 3 and the second restrainer 5. The guide rollers 21 and 22 are further illustrated in connection with FIG. 3. Referring to the gap 20 between the right conveyor belt 1 of the first restrainer 3 and the right conveyor belt 28 of the second restrainer 5, the axes 30 of the guide rollers 21 and 22 are located generally parallel to the plane 23 of the operating surfaces 18 of the conveyor belts 1 and 28. The guide rollers 21 and 22 are further located so that the outer surfaces 31 and 32 of the guide rollers 21 and 22 respectively are tangential to the plane 23 coincident with the operating surfaces 18 of the conveyor means 1 and 28.

The guide rollers 21 and 22 generally form a continuous extension of the plane 23 of the operating surfaces 18 of the right conveyor belts 1 and 28, thus lessening the chance that a leg of an animal 25 may get trapped in the gap 20 between the first restrainer 3 and the second restrainer 5. The guide rollers 22 are preferably positioned sufficiently close to the conveyor belts 1 and 28 to reduce the chance that the leg of an animal 25 will get caught between the conveyor belt 1 and the guide roller 22, or the conveyor belt 28 and the guide roller 22. The gaps 33 between the rollers 22 and the belts 1 and 28 are preferably kept as small as possible.

The guide rollers 21 and 22 are preferably freely rotatable. Alternatively, the guide rollers 21 or 22 may be driven. If the guide rollers 21 and 22 are driven, they should preferably be driven at such a velocity that the peripheric velocity of the guide rollers 21 and 22 equals the velocity of the preceding conveyor belts 1 and 2 in order to avoid further conveyance of an animal 25 present at this transfer position 20 when the first conveyor belts 1 and 2 are stopped by too large of a supply of animals 25 entering into the stunning apparatus.

Although three guide rollers 21 and 22 are shown, any number of guide rollers 21 and 22 may be provided and still remain within the contemplation of the present invention.

Similar guide rollers are provided in the gap between the left conveyor belt 2 of the first restrainer 3 and the left conveyor belt 29 of the second restrainer 5.

Similar guide rollers 34 may also be provided at the entrance 26 of the first restrainer 3. The guide rollers 34 would then provide for a continuous transition from the admission channel 26 to the first restrainer 3.

In the past, conventional conveyor belts have utilized flat links which form a conveyor belt. Such flat links are not suitable for transporting an animal to be stunned. At the location of the reversing wheel, gaps form between adjacent links of a conventional conveyor belt as the links rotate around the reversing wheel. As the links rotate away from the reversing wheel into correspondence with the operating surface 23, the gap between adjacent links close. Typically, an animal's hide and skin become caught and pinched between the gaps of adjacent links. This causes painful injury to the animal, and also serves to agitate the animal. Agitation of the animals just prior to stunning and slaughtering tends to raise the pH value of the meat and reduce the quality of the meat. It would be desirable to provide a conveyor belt that would reduce the tendency of the animal's hide and hair to be caught between adjacent links of the conveyor belt.

Referring to FIG. 1, each conveyor belt 1, 2, 28 and 29 comprises an endless parallel link chain running over reversing wheels 19. FIG. 3 shows a cross-sectional view taken on a plane normal to the plane 23 of the operating surfaces 18 illustrating the improved conveyor belts 1 and 28 provided by the present invention. Each one of the chains has links 12 joined together at hinge shafts 13. Each one of the links 12 possesses a lip 14 on which a plate 15 is mounted. The plates 15 are shaped to reduce the likelihood of an animal's hide and hair being caught in the conveyor means 1 or 28. The plates 15 engage each other to form a gap free and uninterrupted surface which engages the skin of the animals 25 to be conveyed.

Each one of the plates 15 includes a front edge 16 having a generally circular cross-section. The circular front edge 16 is concentric with the hinge shaft 13. Each plate 15 is also provided with a rear edge 6 which has a curvature or arc of about one-quarter of a circle and is likewise concentric with the hinge shaft 13. The trailing edge 6 of each plate 15 surrounds the leading edge 16 of the following plate 15. The rear edge 6 and the circular front edge 16 generally correspond with each other to form a gap free joint and are generally concentric.

The plates 15 possess a curved operating surface 18. The radius of curvature of the curved operating surface 18 corresponds to the arc of rotation about the reversing wheel 19. The curved operating surface 18 is designed so that the operating surface 18 will run concentrically with the axis of the reversing wheel 19 at the location of the reversing wheel 19. In other words, the curvature of the operating surfaces 18 is generally concentric with the pitch circle of the chains at the reversing wheel 19. The plates 15 are hinged about each other without a gap being formed between the plates 15 at the location of the reversing wheel 19.

Prior art plates having a flat operating surface, at the location of a reversing wheel 19, would have produced a constantly varying distance between the surface of a plate and the surface of a nearby guide roller 22. The curved operating surface 18 of the plates 15 of the present invention results in the distance between the surface of the plates 15 and the guide rollers 22 remaining generally constant at the location of the reversing wheel 19. It thus becomes possible in accordance with the present invention to move a guide roller 22 very close to the operating surface 18 of the plates 15 such that a minimum gap width will be maintained between the operating surface 18 of the plates 15 and the guide rollers 22 to minimize the risk that an animal's hide, hair or leg may become caught between the guide rollers 22 and the plates 15.

The curvature of the operating surface 18 of the plates 15 promotes the entrainment of the animals. When the plates 15 are moving in a straight line tangential to the operating plane 23, the curved surfaces 18 tend to hold the animal's skin and hair away from the joints between the adjacent plates 15. This minimizes the risk that an animal's hair or hide may become caught between adjacent plates 15.

The electrodes 7 and 8 are illustrative examples only. Variations may be made in the arrangement of the electrodes 7 and 8, and modifications may be made, without departing from the scope of the invention.

It is to be understood that the invention will admit of other embodiments. The description of the presently preferred embodiment is given only to facilitate understanding of the invention by those skilled in the art and should not be construed as limiting the invention.

What is claimed is:

1. An apparatus for stunning animals to be slaughtered, comprising:
at least one animal conveyor, said conveyor including two endless conveyor means, said conveyor means comprising a plurality of chain links, said conveyor means being positioned to form a substantially V-shaped passageway therebetween, each one of said conveyor means consisting of endless chains of chain links which are hinged together, provided with a plurality of plates, each plate being associated with a chain link, each plate having an operating surface, said plates being contiguous with respect to each other at the location of the operating surface to minimize gaps between the plates, said plates having a dimension in the direction of conveyance which corresponds with the length of a chain link, said plates being operable to hinge about each other at their adjacent edges by means of curved edge portions, said curved edge portions being concentric with the associated hinge shaft of the chain links, the curved edge portions of adjacent plates being in correspondence with each other to minimize the formation of gaps between adjacent plates as the plates revolve around a reversing wheel in order to avoid the entrainment of an animal's hide and hair in the conveyor means.

2. The apparatus according to claim 1, wherein at the location of the entrance of a conveyor there are provided guide rolls, said guide rolls being parallel to the operating surfaces of the plates of the associated conveyor means, said guide rolls at the periphery thereof being tangential to a plane coincident with said operating surfaces, the guide rolls being adapted to provide a smooth transition for the movement of an animal from an admission channel to the animal conveyor in order to minimize the likelihood of the animal's hide, hair and legs being caught in the conveyor means.

3. The apparatus according to claim 2, wherein said guide rolls are adapted to be driven.

4. The apparatus according to claim 3, further comprising two or more conveyors wherein the peripheral velocity of said guide rolls is generally equal to the velocity of the preceding conveyor means.

5. The apparatus according to claim 1, 2, 3, or 4, wherein said operating surface of the plates have a curved outer plane, said plane being concentric with the axis of the reversing wheel at the location of said reversing wheel.

6. An apparatus for stunning animals to be slaughtered, comprising:
at least one animal conveyor, the conveyor including two endless conveyor means, the conveyor means being positioned to form a substantially V-shaped passageway therebetween;

the conveyor means comprising a plurality of links, the links being pivotally attached one to another with a front and a rear hinge shaft for each link, the links forming an endless conveyor chain, the links each having a lip;

a plurality of plates, wherein a plate is mounted on the lip of each link, the plate having a curved outer operating surface for bearing against an animal to be stunned, the outer operating surface being curved outwardly such that the arc formed by the operating surface as the plate moves around a reversing wheel is generally concentric with the axis of the reversing wheel, the curved outer operating surface being adapted to form a smooth cylindrical outer surface at the reversing wheel, the curved outer operating surface being adapted to provide curved ridges for contacting an animal which are adapted to hold the animal's hide away from joints between adjacent links; and, the plate further having a circular front edge, the front edge being generally concentric with the front hinge shaft, the plate having a rear edge, the rear edge having a concave surface forming an arc that is generally concentric with the rear hinge shaft, the concave surface of the rear edge being adapted to correspond generally with the circular surface of the front edge of an adjoining plate to minimize the tendency of the animal's hide and hair to be caught between the links of the conveyor means.

7. The apparatus according to claim 6, further comprising a plurality of guide rolls, the guide rolls being located at the entrance of the conveyor, the guide rolls being generally cylindrical, the guide rolls being generally parallel to the operating surfaces of the plates, the guide rolls being located so that the outer surfaces of the guide rolls are tangential to a plane coincident with the operating surfaces of the plates.

8. An apparatus for stunning animals to be slaughtered, comprising:

a first and a second animal conveyor, each conveyor including two endless conveyor means, the conveyor means being positioned to form a substantially V-shaped passageway therebetween, the first conveyor being located such that the V-shaped passageway of the first conveyor is generally in line with the V-shaped passageway of the second conveyor so that an animal held in the first conveyor will be transferred to the second conveyor;

the conveyor means including a plurality of links, the links being pivotally attached one to another with a front and a rear hinge shaft for each link, the links forming an endless conveyor chain, the links each having a lip;

a plurality of plates, wherein a plate is mounted on the lip of each link, the plate having a curved outer operating surface for bearing against an animal to be stunned, the outer operating surface being curved outwardly such that the arc formed by the operating surface as the plate moves around a reversing wheel is generally concentric with the axis of the reversing wheel;

the plate further having a circular front edge, the front edge being generally concentric with the front hinge shaft, the plate having a rear edge, the rear edge having a concave surface forming an arc that is generally concentric with the rear hinge shaft, the concave surface of the rear edge being adapted to correspond generally with the circular surface of the front edge of an adjoining plate to minimize the tendency of the animal's hide and hair to be caught between the links of the conveyor means; and, a plurality of guide rolls, the guide rolls being located between the first conveyor and the second conveyor to provide a continuous transition between the conveyors and to inhibit the tendency of an animal's leg, hair and hide to be caught between the conveyors, the guide rolls being located with their axis generally parallel to the operating surfaces of the plates, the guide rolls being located so that the outer surfaces of the guide rolls are tangential to a plane coincident with the operating surfaces of the plates.

* * * * *

UNITED STATES PATENT AND TRADEMARK OFFICE
CERTIFICATE OF CORRECTION

PATENT NO. : 4,406,036

DATED : September 27, 1983

INVENTOR(S) : Johan W. Nijhuis

It is certified that error appears in the above-identified patent and that said Letters Patent is hereby corrected as shown below:

Column 3, line 67, change "29" to -- 2 --; change "second" (first occurrence) to -- first --; and change "5" to -- 3 --.

Column 4, line 68, change "gap" to -- gaps --.

Signed and Sealed this

Sixth Day of March 1984

[SEAL]

Attest:

GERALD J. MOSSINGHOFF

Attesting Officer     Commissioner of Patents and Trademarks